(12) United States Patent
Yamamoto

(10) Patent No.: US 10,652,477 B2
(45) Date of Patent: May 12, 2020

(54) NIGHT VISION IMAGING APPARATUS

(71) Applicant: Panasonic Intellectual Property Management Co., Ltd., Osaka (JP)

(72) Inventor: Norikazu Yamamoto, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/128,448

(22) Filed: Sep. 11, 2018

(65) Prior Publication Data
US 2019/0089889 A1 Mar. 21, 2019

(30) Foreign Application Priority Data

Sep. 20, 2017 (JP) ................................. 2017-180465

(51) Int. Cl.
| | | |
|---|---|---|
| *B60R 21/00* | (2006.01) | |
| *H04N 5/00* | (2011.01) | |
| *H04N 5/235* | (2006.01) | |
| *H04N 5/225* | (2006.01) | |

(52) U.S. Cl.
CPC ......... *H04N 5/2354* (2013.01); *H04N 5/2256* (2013.01); *H04N 5/2351* (2013.01)

(58) Field of Classification Search
CPC ........ B60R 21/01534; B60R 2300/106; G06T 2207/10048; H04N 5/332
USPC ...................................................... 348/164
See application file for complete search history.

(56) References Cited

U.S. PATENT DOCUMENTS

| | | | | |
|---|---|---|---|---|
| 5,969,754 | A | 10/1999 | Zeman | |
| 6,497,503 | B1* | 12/2002 | Dassanayake | B60Q 1/085 362/465 |
| 2002/0070342 | A1* | 6/2002 | Berenz | H04N 5/23296 250/353 |
| 2004/0218172 | A1* | 11/2004 | DeVerse | G01J 3/2823 356/300 |
| 2015/0070528 | A1* | 3/2015 | Kikuchi | H04N 9/07 348/224.1 |

(Continued)

FOREIGN PATENT DOCUMENTS

| | | |
|---|---|---|
| JP | 2001-522544 | 11/2001 |
| JP | 2009-096323 | 5/2009 |

(Continued)

*Primary Examiner* — Jeffery A Williams
(74) *Attorney, Agent, or Firm* — Wenderoth, Lind & Ponack, L.L.P.

(57) ABSTRACT

A night vision imaging apparatus includes a light projecting section, a light amount controller, an imaging section, and a recording section. The light projecting section casts a near infrared ray as illumination light on an illumination area. The light amount controller controls an amount of the illumination light on each one of sub-areas forming the illumination area. The imaging section images the illumination area, and generates image data. The recording section records the image data generated by the imaging section. The light amount controller divides an image shown in the image data into a plurality of divided portions, and determines a light intensity of each one of the plurality of divided portion, and then controls an amount of the illumination light to be casted on a sub-area corresponding to each one of the plurality of divided portions among the sub-areas of the illumination area based on the determined light intensity.

9 Claims, 8 Drawing Sheets

(56) References Cited

U.S. PATENT DOCUMENTS

| | | | |
|---|---|---|---|
| 2016/0080625 A1* | 3/2016 | Itoh | G06K 9/00771 348/234 |
| 2018/0239979 A1* | 8/2018 | Ohno | A61B 5/1171 |
| 2018/0262667 A1* | 9/2018 | Chen | H04N 5/2352 |

FOREIGN PATENT DOCUMENTS

| | | |
|---|---|---|
| JP | 4404474 B2 * | 1/2010 |
| JP | 2013-026656 | 2/2013 |
| WO | 1998/026583 | 6/1998 |

* cited by examiner

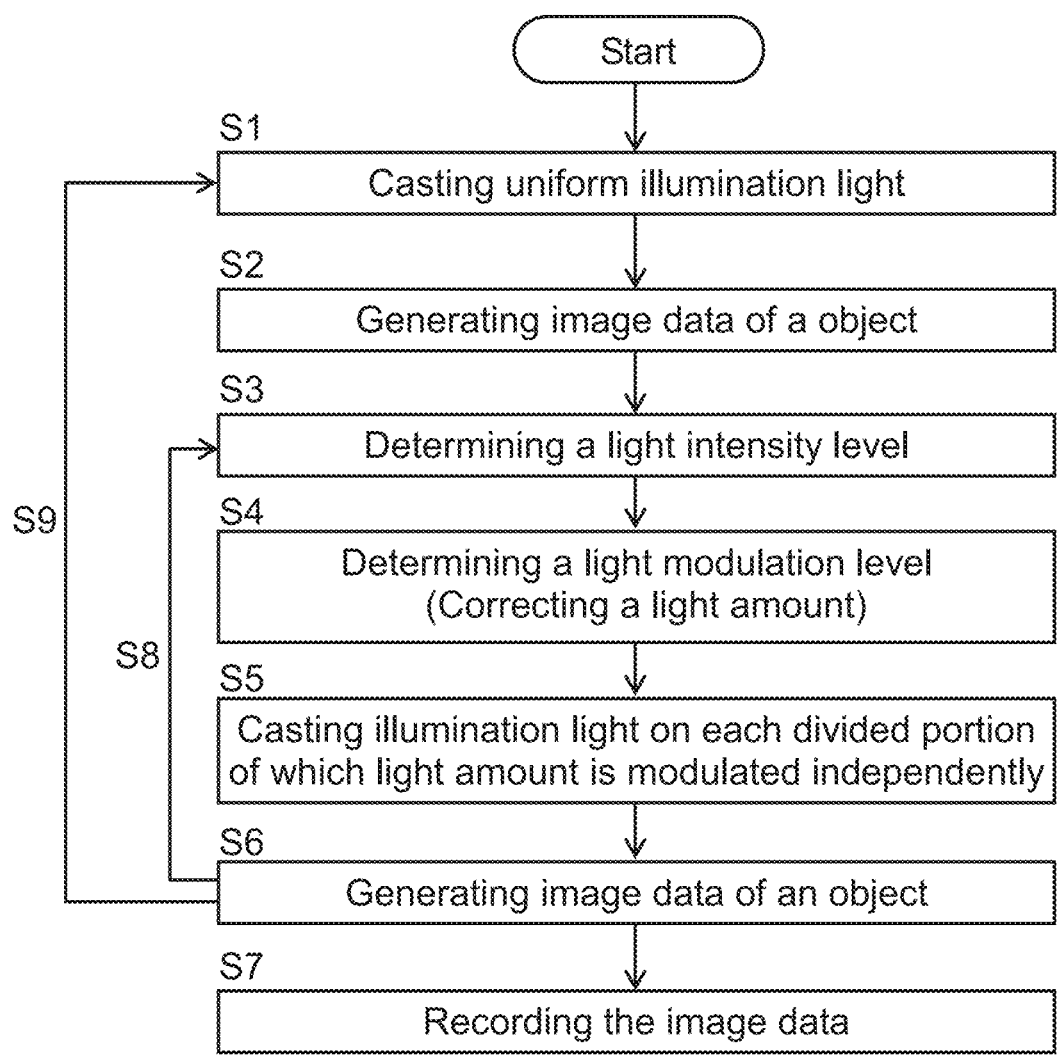

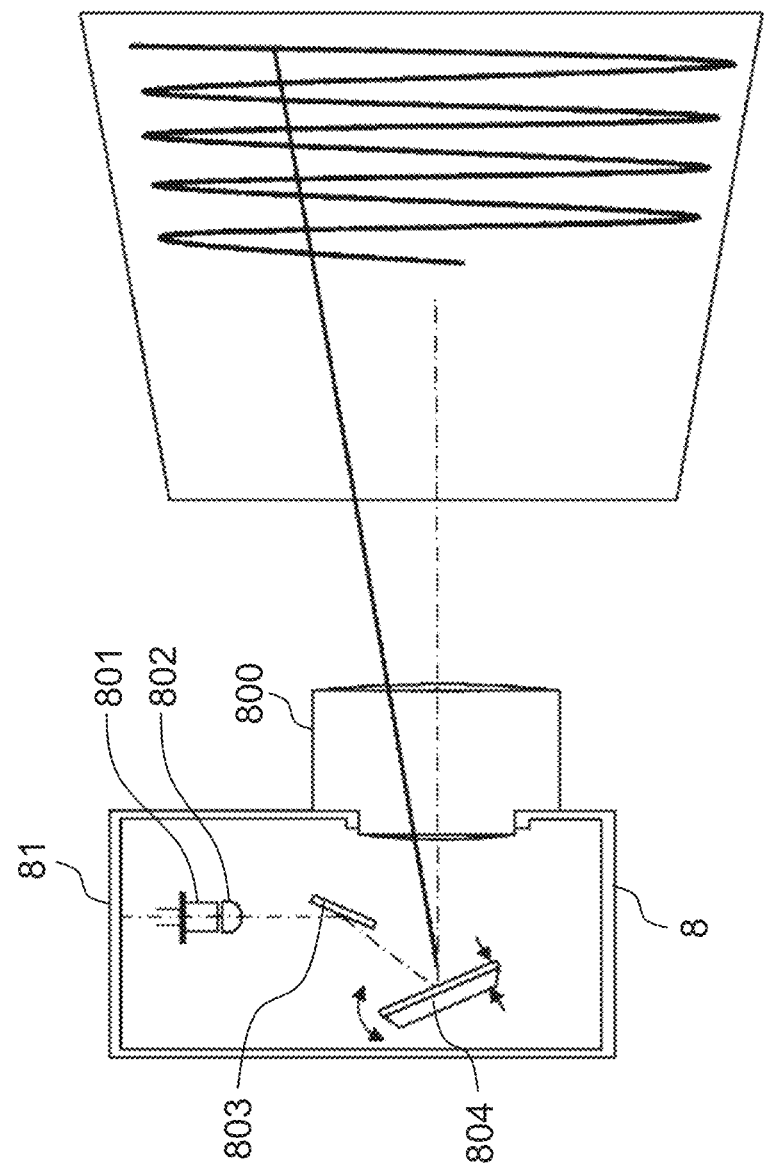

NIGHT VISION IMAGING APPARATUS

BACKGROUND

Technical Field

The present disclosure relates to a night vision imaging apparatus employing near infrared rays as an illumination light source.

Description of the Related Art

Distribution or recording of images imaged by an imaging device such as a surveillance camera has been done for preventing criminals or damages by disasters. During the night, in particular, near infrared rays are used instead of visible light as illumination light casted on an object for the surveillance camera to record the image in order to avoid light pollution.

Multiple cannonball-shaped LEDs giving off near infrared rays are used as illumination light sources of the night vision imaging apparatus, and they are placed around an imaging camera, so that an entire object to be imaged can be illuminated. The foregoing night, vision imaging apparatus is presently used.

Patent literature 1 (Unexamined Japanese Patent Application Publication No. 2013-026656) discloses an imaging device that selectively illuminates any area within an imaging range. This imaging device comprises the following structural elements:

an imaging means for imaging a predetermined area;
a display means for displaying an image imaged by the imaging means;
an illumination means for casting illumination light on the predetermined area;
an image processing means for extracting the predetermined area from multiple areas forming the image imaged by the imaging means, and displaying the predetermined area on the display means; and
an illumination control means for controlling the illumination means such that the illumination light can be casted on a place, of the imaging object, corresponding to the predetermined area that is to be displayed on the display means.

The structure discussed above allows casting the illumination light on each of selected areas of the imaging range and displaying a imaged image of each of the areas in the predetermined order, whereby the electric power necessary for casting the illumination light can be reduced, and also clear imaged images can be displayed.

SUMMARY

A night vision imaging apparatus sometimes shoots a street in parallel to an extension of the street. In this case the distance from the imaging device to a object largely varies resultantly from 1 meter to about 50 meters depending on each area in the entire picture. The illumination light given off uniformly will result in large differences in the intensity of the illumination light depending on a near object and a far object. The light intensity thus sometimes exceeds the dynamic range of the imaging device, and the near object causes halation due to overexposure, while the far object causes black crush due to underexposure in an image of one frame.

To overcome the foregoing narrow dynamic range, multiple images imaged with different shutter speeds are used for connecting positions of proper exposure, thereby relieving the halation or the black crush. Nevertheless, this technique limits a frame rate of the entire video to a frame rate of the slowest shutter speed, viz. the frame rate at long-time exposure. As a result, use of a pickup element in general use (60 frames/second) will produce videos of 5-15 frames/second, viz. they change harshly, in other words, they change at greater intervals.

A technique disclosed in patent literature 1 limits a light-emitting area to only one area within an angle of view of the imaging device, whereby an object can be imaged with a proper exposure in each area. Nevertheless this technique needs the number of frames equal to the divided number of a picture in order to display every part of the angle of view. For instance, in the case of imaging a traveling vehicle, the imaging device needs to have a pickup element capable of recording image data with an extremely high frame rate in response to the divided number of the picture. On top of that, an increment in the frame rate will shorten the time of illumination casted on each area. As a result, an amount of illumination light must be increased, so that the entire device becomes bulky.

The present disclosure provides a night vision imaging apparatus capable of imaging a quality image during the night.

One aspect of the present disclosure provides a night vision imaging apparatus comprising the following structural elements:

a light projecting section including a light source element emitting a near infrared ray, and casting the near infrared ray as illumination light on an illumination area;
a light amount controller controlling an amount of the illumination light on each one of sub-areas forming the illumination area;
an imaging section imaging the illumination area, and generating image data; and
a recording section recording the image data generated by the imaging section.

The light amount controller divides an image shown in the image data into a plurality of divided portions, and determines a light intensity of each one of the plurality of divided portion, and then controls an amount of the illumination light to be casted on a sub-area corresponding to each one of the plurality of divided portions among the sub-areas of the illumination area based on the determined light intensity.

The night vision imaging apparatus of the present disclosure allows properly adjusting the amount of illumination light to be casted on the object in each area so that a difference in brightness in the area of the imaged image can be reduced. This function allows imaging a quality image even in a situation of low luminous intensity such as in the night.

BRIEF DESCRIPTION OF DRAWINGS

FIG. 3 is a flowchart illustrating operations of the night vision imaging apparatus.

FIG. 8 schematically illustrates a structure of a light projecting section in accordance with a third embodiment.

DETAILED DESCRIPTION

The embodiments will be detailed hereinafter with reference to the accompanying drawings. Descriptions more than necessary will be omitted sometimes. For instance, detailed descriptions of well-known matters will be omitted, or duplicable descriptions about substantially the same structures will be omitted sometimes. These omissions will avoid redundancy in the descriptions and help ordinary skilled persons in the art understand the present disclosure with ease.

The accompanying drawings and the descriptions below are provided for the ordinary skilled persons in the art to fully understand the present disclosure, and not to mention, these materials do not intend to limit the scope of the claims.

First Exemplary Embodiment

The first embodiment is described hereinafter with reference to FIG. 1-FIG. 6. In this embodiment, a night vision imaging apparatus including a light projecting section having a projector device is taken as a specific example of the night vision imaging apparatus in accordance with the first embodiment.

1-1. Structure

Figure 1:
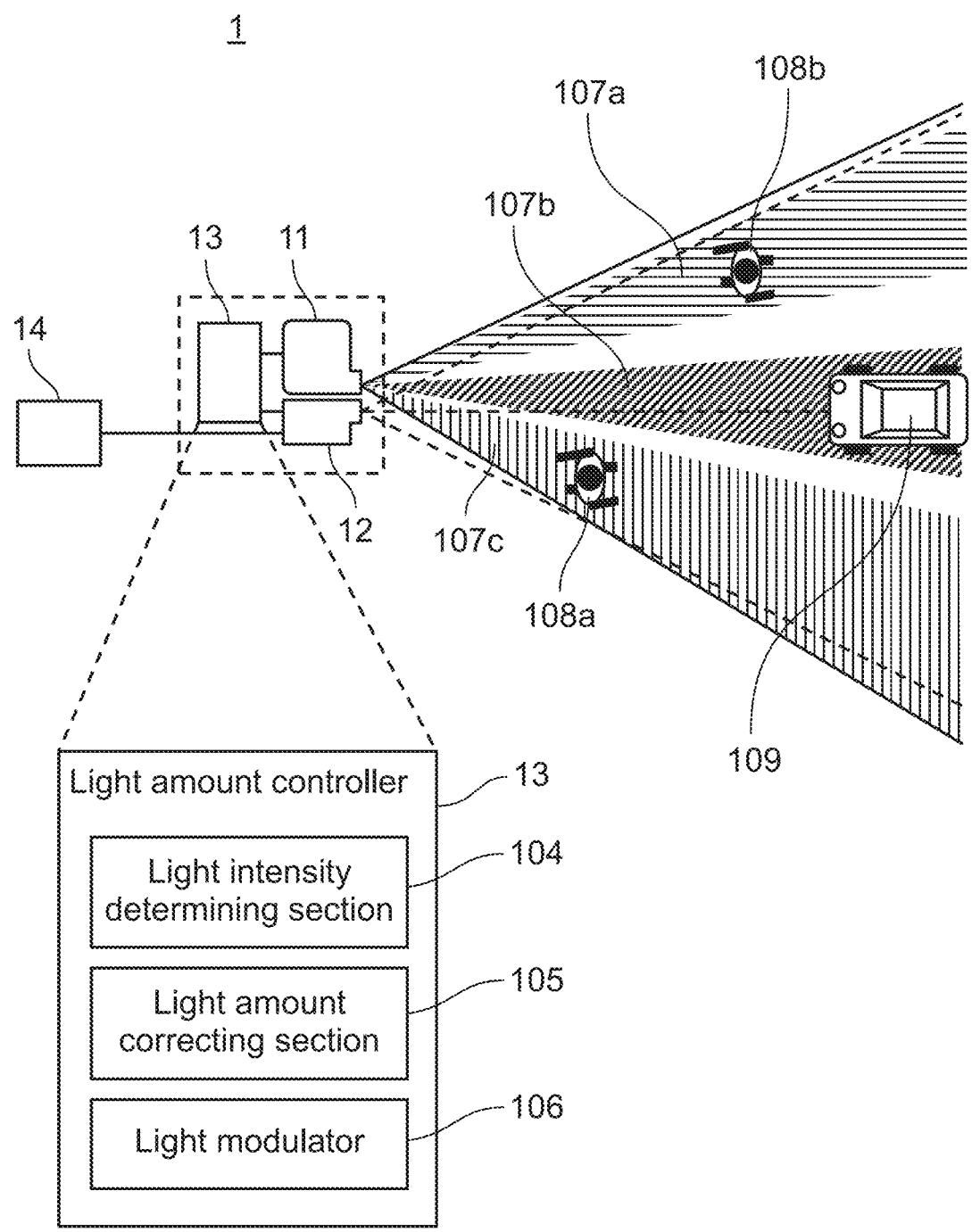
FIG. 1 schematically illustrates a night vision imaging apparatus in accordance with a first embodiment.

The night vision imaging apparatus shoots an object for generating image data (video). This device, in particular, has a function of illuminating an imaging area with near infrared rays, so that it can generate image data of excellent picture quality even in a situation of low luminous intensity such as in the night. FIG. 1 schematically illustrates a structure of the night vision imaging apparatus in accordance with the first embodiment. As FIG. 1 shows, night vision imaging apparatus 1 includes light projecting section 11, imaging section 12, light amount controller 13, and recording section 14. Imaging section 12 is connected to light projecting section 11 via light amount controller 13.

Light projecting section 11 casts illumination light on an illumination area in a predetermined illumination range (angle of view). Light projecting section 11 can vary an intensity of the illumination light for each sub-area of the entire illumination area.

Imaging section 12 shoots an object in the predetermined range for generating an image signal (image data). Imaging section 12 includes an optical system such as lenses, and an image sensor such as a CMOS image sensor. In this embodiment, the imaging range (i.e. angel of view) of imaging section 12 is set generally equal to an illumination range (illumination angle of view) for the convenience of description purpose.

Light amount controller 13 controls an amount of illumination light (intensity) for each predetermined sub-area of the range on which the illumination light is casted. Light amount controller 13 includes light intensity determining section 104, light amount correcting section 105, and light modulator 106. Light amount controller 13 also includes a control circuit such as CPU, MPU, FPGA, or ASIC.

Recording section 14 records the image data generated by imaging section 12. Recording section 14 is connected to imaging section 12 via a communication line such as HDM®, SDI (Serial Digital Interface), HD-baseT, or LAN. Recording section 14 includes a recording medium capable of recording data, the medium includes such as HDD (Hard Disk Drive), SSD (Solid State Drive), memory card, or optical disk.

1-1-1. Structure of Light Projection Section

Figure 2:
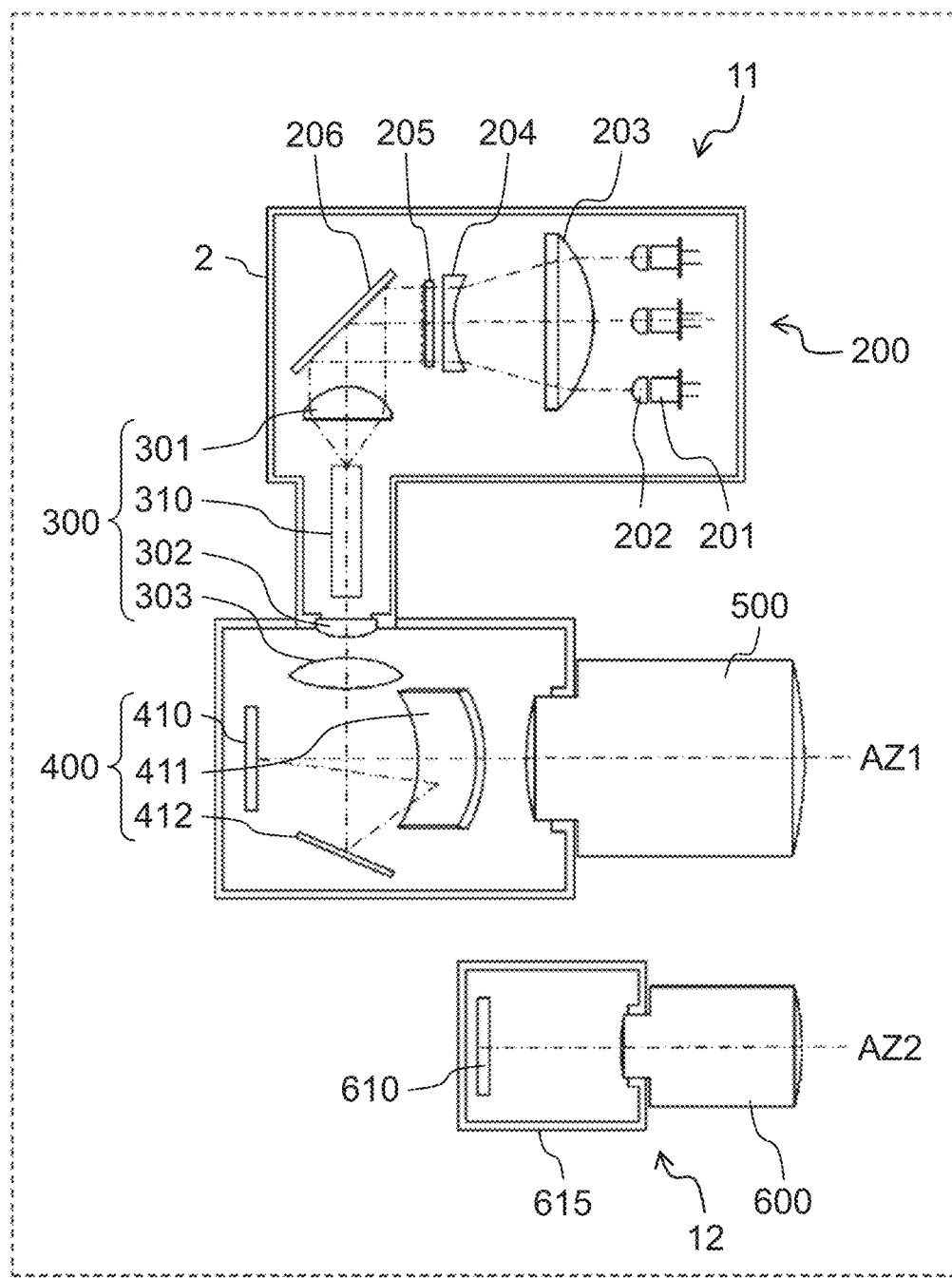
FIG. 2 schematically illustrates a structure of a light projecting section of the night vision imaging apparatus.

FIG. 2 shows an optical structure of light projecting section 11 and a positional relation between light projecting section 11 and imaging section 12. As FIG. 2 shows, light projecting section 11 and imaging section 12 are disposed orthogonally to optical axes AZ1 and AZ2 respectively such that optical axis AZ1 of light projecting section 11 can be in parallel with optical axis AZ2 of imaging section 12.

Light projecting section 11 includes illumination device 200, relay optical system 300, illumination light generator 400, and projection optical system 500. Illumination device 200, relay optical system 300, and illumination light generator 400 are accommodated in cabinet 2. Projection optical system 500 is disposed outside cabinet 2.

Light projecting section 11 generates illumination light through the following process: the light generated by illumination device 200 is modulated in illumination light generator 400 with the aid of a digital micro-mirror device in response to a light modulation signal supplied from light modulator 106 (shown in FIG. 1) of light amount controller 13. Light projecting section 11 projects the generated light to the object with the aid of projection optical system 500. Each part of light projecting section 11 is detailed below.

Illumination device 200 gives off near infra-red rays, and includes multiple semiconductor laser diodes (hereinafter referred to simply as LD) 201 for giving off the near infra-red rays, multiple lenses 202, 203, 204, diffuser 205, and reflection mirror 206. Lens 202 is a collimating lens for parallelizing the light emitting from LD 201. Lenses 203 and 204 form an afocal system for converging the parallelized light and generating collimated light. To be more specific, lens 203 is a condenser lens for condensing the parallelized light from multiple lenses 202, and lens 204 is a concave lens for parallelizing the light from lenses 202. Diffuser 205 diffuses the light from lens 204, and reflection mirror 206 turns a traveling direction of the light supplied from diffuser 205 by 90 degrees in order to downsize the entire device, and then gives off the near infra-red rays supplied from diffuser 205 to relay optical system 300.

Relay optical system 300 leads the light supplied from illumination device 200 to illumination light generator 400, and includes rod integrator 310, lenses 301, 302 and 303.

Lens 301 leads the light from illumination device 200 to rod integrator 310.

Rod integrator 310 is a solid (not hollow) rod formed of transparent material such as glass. Rod integrator 310 reflects incident light therein multiple times, thereby generating the light of which light intensity is distributed uniformly. Rod integrator 310 can be hollow inside, instead of solid, with a mirror-finished inner wall.

Lenses 302 and 303 form a relay-lens that allow the light emitting from rod integrator 310 to form a rough image on the DMD (Digital Micro Device) in illumination light generator 400.

Illumination light generator 400 modulates the light supplied from relay optical system 300 with a light modulation signal supplied from light modulator 106, thereby generating the illumination light. Illumination light generator 400 includes DMD 410 and mirrors 411, 412.

Mirror 412 totally reflects the incident light from relay optical system 300, and then leads the resultant light to mirror 411. Mirror 411 is made of translucent material, and totally reflects the incident light that enters at an angle equal to or greater than a critical angle. The light totally reflected then enters DMD 410.

DMD 410 modulates the incident light from mirror 411 based on a modulation signal supplied from light modulator 106, and generates time-divisionally the illumination light of which light amount differs for each sub-area. DMD 410 is an instance of a light modulation element, which is not limited to DMD but can employ a liquid crystal display element.

To be more specific, DMD 410 includes multiple movable micro mirrors. Each one of the micro mirrors basically corresponds to one pixel. DMD 410 changes an angle of each micro mirror based on a modulation signal supplied from the light modulator, thereby determining whether or not the light reflected from DMD 410 should travel toward projection optical system 500. Among the light reflected from DMD 410, some of the light enters projection optical system 500, because this light enters mirror 411 at an angle equal to or smaller than the critical angle, so that this light penetrates through mirror 411, and then enters projection optical system 500.

Projection optical system 500 expands the illumination light supplied from illumination light generator 400 and then casts the light on the object in the illumination area.

Imaging section 12 includes imaging optical system 600, imaging element 610, and housing 615. Imaging element 610 is disposed in housing 615, and imaging optical system 600 is mounted to outside housing 615. Imaging optical system 600 is formed of lenses and others, and forms an image of an object on imaging element 610, which is an image sensor such as a CMOS image sensor and generates image data of the image of the object.

1-2. Operation

The operations of night vision imaging apparatus 1 discussed above are detailed hereinafter.

1-2-1. Operation of Determining Light Intensity

Figure 4A:
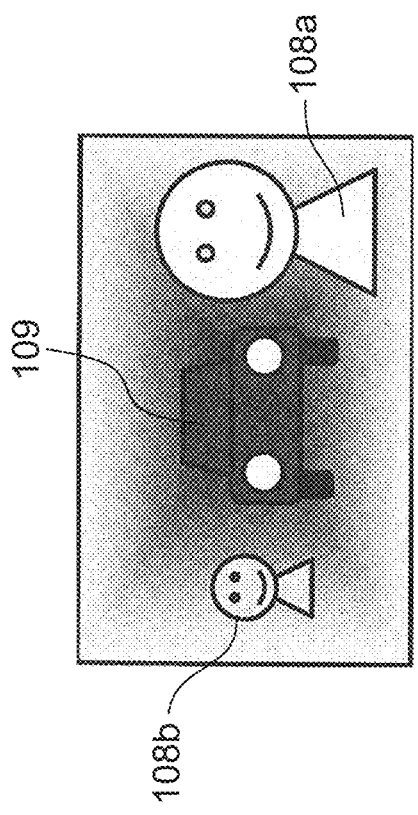
FIGS. 4A-4D illustrate how a light intensity determining section determines a light intensity level.

FIG. 3 is a flowchart of image recording operations of night vision imaging apparatus 1. The operations of night vision imaging apparatus 1 are demonstrated with reference to FIG. 3. In the description below, the case, where objects 108a, 108b, and 109 are imaged in the illumination area as shown in FIG. 4A, is taken as an example.

Light projecting section 11 of night vision imaging apparatus 1 illuminates the illumination area (e.g. objects 108a, 108b, and 109 shown in FIG. 4A) with uniform near infrared rays (step S1). Imaging section 12 receives the light reflected from the illuminated objects and also object light given off from the objects per se, thereby generating image data (step S2). Imaging section 12 then transmits the image data to light amount controller 13.

Light amount controller 13 determines light-intensity levels of each sub-area included in the entire area of the image based on the image data received (step S3). For instance, in the case of the image data formed of 8-bit information, since the image data has a light-intensity level of 256 gradations, a reference to a value (brightness of the image) of the light-intensity level of the image data will allow determining the strength of the light intensity. Light intensity determining section 104 divides the entire area of the image shown in the image data into multiple divided portions for controlling them, and determines the light-intensity levels for each one of the divided portions. The light-intensity of each divided portion can be calculated, for instance, by finding an average of light-intensity levels of pixels included in each divided portion. Light intensity determining section 104 generates information that shows a determined result of light-intensity level.

Figure 4B:
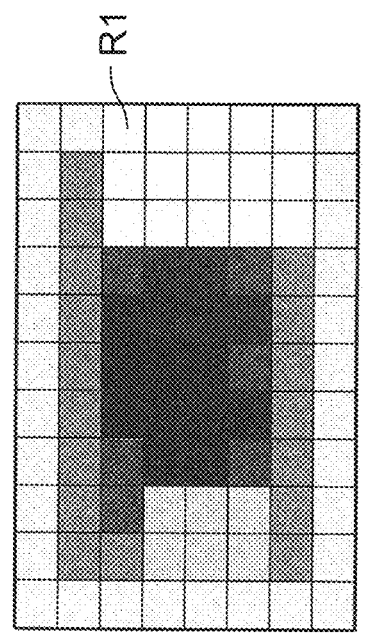
Figure 4C:
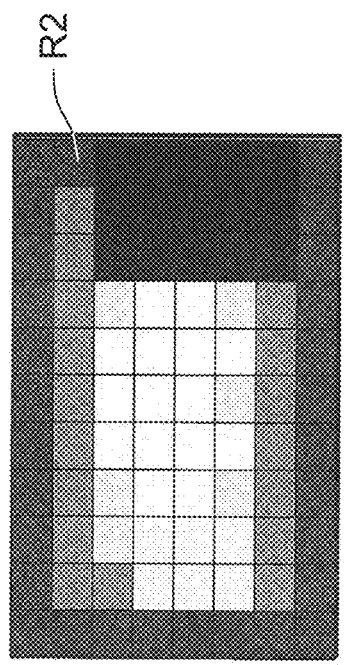

FIG. 4B illustrates image information generated by light intensity determining section 104 for representing the determined result of the light-intensity level. As shown in FIG. 4B, the entire area of the image shown in the image data is divided into rectangular-shaped divided portions R1. The light intensity of each divided portion R1 is set to a value in response to the average light-intensity level of the divided portions. Light intensity determining section 104 transmits the information of the determined result to light amount correcting section 105.

A shape of the divided portion is not limited to the rectangular shape, but the shape thereof can be set appropriately to a setting condition. For instance, the shape of the divided portion can be a conical shape. The number of divided portions can be changed in response to the angle of view of imaging section 12, viz. the angle of view of the illumination range (size of the illumination area covered by illumination light) of light projecting section 11. For instance, a greater angle of view of imaging section 12 allows imaging an object in a smaller size. The greater angle of view thus allows setting the divided portions in a greater number, viz. setting the divided portions each having a smaller area. To the contrary, a smaller angle of view enlarges an object. The smaller angle of view thus allows setting the number of divided portions in a smaller number, viz. setting the divided portions each having a greater area. This mechanism allows reducing noises produced when the object moves.

Instead of dividing the area, the resolution of the image data generated by imaging section 12 can be changed (mosaic process). For instance, in the case of the image data formed of full HD (High Definition, i.e. 1920×1080 pixels), the resolution is changed to ⅛ (undergoes a mosaic process), then an image formed of 480×135 pixels is output. During this resolution change process, a light intensity of the area corresponding to the original 64 pixels is averaged, and is output to an after-change area corresponding to the original area. The light-intensity level of the after-change area corresponding to the original 64 pixels area can be used as a determined value of the original 64 pixels area.

The illumination light supplied from light projecting section 11 has characteristics close to that of a point light source, so that a greater distance from light projecting section 11 to an object causes a smaller intensity of the light casted on the object. The greater distance thereof also lowers more sharply an intensity of light reflected from the illuminated object. In the case of no object light given off from the object per se, the greater distance from light projecting section 11 to the object more drastically changes a difference in the light intensities among adjacent pixels of the image shown in the image data generated by imaging section 12. Considering this mechanism, when there is a great difference in distances to the object from adjacent divided portions in the image data or there is a great difference in light intensities between the adjacent divided portions, an increment in the number of divided portions allows reducing the change in the light intensity levels between the adjacent divided portions. Light intensity determining section 104 can change the number of divided portions in response to the information of the brightness of the image shown in the image data.

1-2-2. Operation of Correcting Light Amount

Based on the determined result supplied from light intensity determining section 104, light amount correcting section 105 determines an amount, viz. light modulation level, of the illumination light to be casted by light projecting section 11 (step S4). Light amount correcting section 105 generates correction data for correcting a light amount of an area, where light intensity level is low, to a greater light amount, and for correcting a light amount of an area, where light intensity level is high, to a smaller light amount. For instance, an inversion of the image data shown in FIG. 4B and generated by light intensity determining section 104 allows generating correction data shown in FIG. 4D, where the image data shows the determined result. Use of this correction data allows correcting the light amount of the area, where the light intensity level is low, to a greater light amount, and allows correcting the light amount of the area, where the light intensity level is high, to a smaller light amount. A range of the image shown in the correction data indicates the area (range) on which light projecting section 11 casts the illumination light. Sub-area R2 shown in the correction data is a divided area of the illumination area on which the illumination light is casted, and corresponds to divided portion R1 shown in the image data.

In this case, a correction of the light intensity level based on an average light intensity level of the entire picture allows imaging an image with an easily recognizable exposure across the picture, where the average light intensity level is used as a center value. Light amount correcting section 105 transmits the correction data thus generated to light modulator 106.

1-2-3. Operation of Modulating Light

Based on the correction data received from light amount correcting section 105, light modulator 106 modulates an amount of illumination light to be casted from light projecting section 11 on each sub-area R2 of the illumination area, and casts the illumination light having a modulated light amount on each sub-area R2 (step S5).

To be more specific, based on the correction data received from light amount correcting section 105, light modulator 106 generates a modulation signal for controlling the light amount for each sub-area R2 of the illumination area. Using this modulation signal, light modulator 106 controls DMD 410, which follows the modulation signal to generate the illumination light (including near infrared rays 107a-107c) of which light amount is adjusted for each sub-area R2 before casting the illumination light on the illumination area.

1-2-4. Operation of Obtaining and Recording Image Data

Figure 4D:
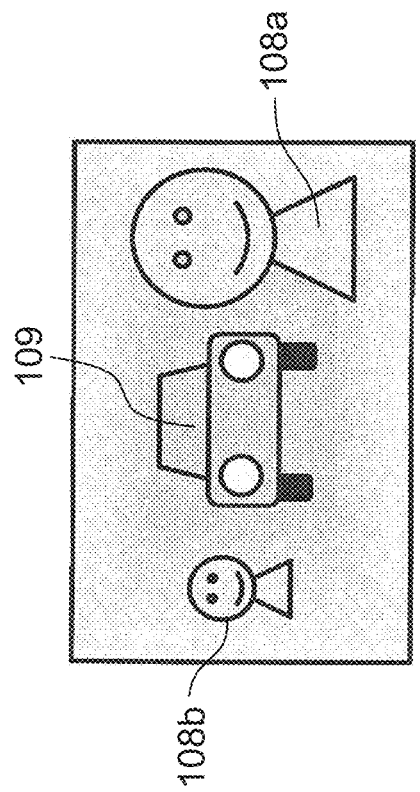

Imaging section 12 shoots the illumination area (including objects 108a, 108b, 109) illuminated with the illumination light (including near infrared rays 107a-107c) of which light amount has been modulated, and generates the image data (step S6). The object is thus imaged with the illumination light, viz. near infrared rays, of which light amount has been modified in response to the reflection light from the object and the object light given off from the object per se. As a result, imaging section 12 can generate image data, in which only a small difference is found in light intensity levels between each one of areas, and halation as well as black crush is relieved. FIG. 4D shows an illustrative image of the object shown in FIG. 4A imaged with the illumination light of which light amount has been corrected as discussed above. FIG. 4A shows that objects 108a, 108b, and 109 having differences in brightness from each other are imaged. Nevertheless, these objects are imaged this time with the illumination light of which light amount is corrected for each sub-area R2, and the resultant image is shown in FIG. 4D, where the differences in brightness are reduced across the picture. In response to the light intensity level of the image data generated by imaging section 12, a shutter speed of an electronic shutter or a gain of a pickup element can be adjusted appropriately, so that a proper exposure can be set. The image data then is transmitted to recording section 14 via a communication line, and the image data is stored in recording section 14 (step S7).

1-2-5. Routine Operation

An object does not always remain stationary, but it sometimes moves. When imaging section 12 shoots an object in a present frame with a light amount set based on a condition of the object in the previous frame, a position of the object possibly moves. In this case, the set light amount does not always work properly, so that the series of operations discussed above (step S3-S6) are repeated (step S8) to follow the movement of the object. As a result, illumination light properly following the movement can be set, and the image data (video data), in which halation and black crush are relieved, is obtainable.

When the correction based on the image data supplied from imaging section 12 is always fed back, the correction information is superimposed, which sometimes invites hunting in brightness depending on the condition. To avoid this trouble, light projecting section 11 periodically casts uniform illumination light having experienced no modulation (step S9).

1-3. Other Control Applications

In the case where imaging section 12 generates image data at an interval of 1/60 second (60 fps), light amount controller 13 preferably feeds back the correction to light projecting section 11 at an interval equal to or shorter than 1/60 second. Operations of light amount controller 13 desirably delay as little as possible with respect to the image data supplied from imaging section 12. The operations of light amount controller 13 are preferably carried out fast by using a dedicated FPGA (Field Programmable Gate Array); nevertheless, a general-purpose computer can be used in order to lower the cost and reduce the electric power. In the case of using the general-purpose computer, the process can be carried out by an image process depending on the computing speed. For instance, the process to be done in light intensity determining section 104 can be replaced with the resolution change of the image data, and the process to be done in light amount correcting section 105 can be replaced with a color inversion process of the image data.

Figure 5:
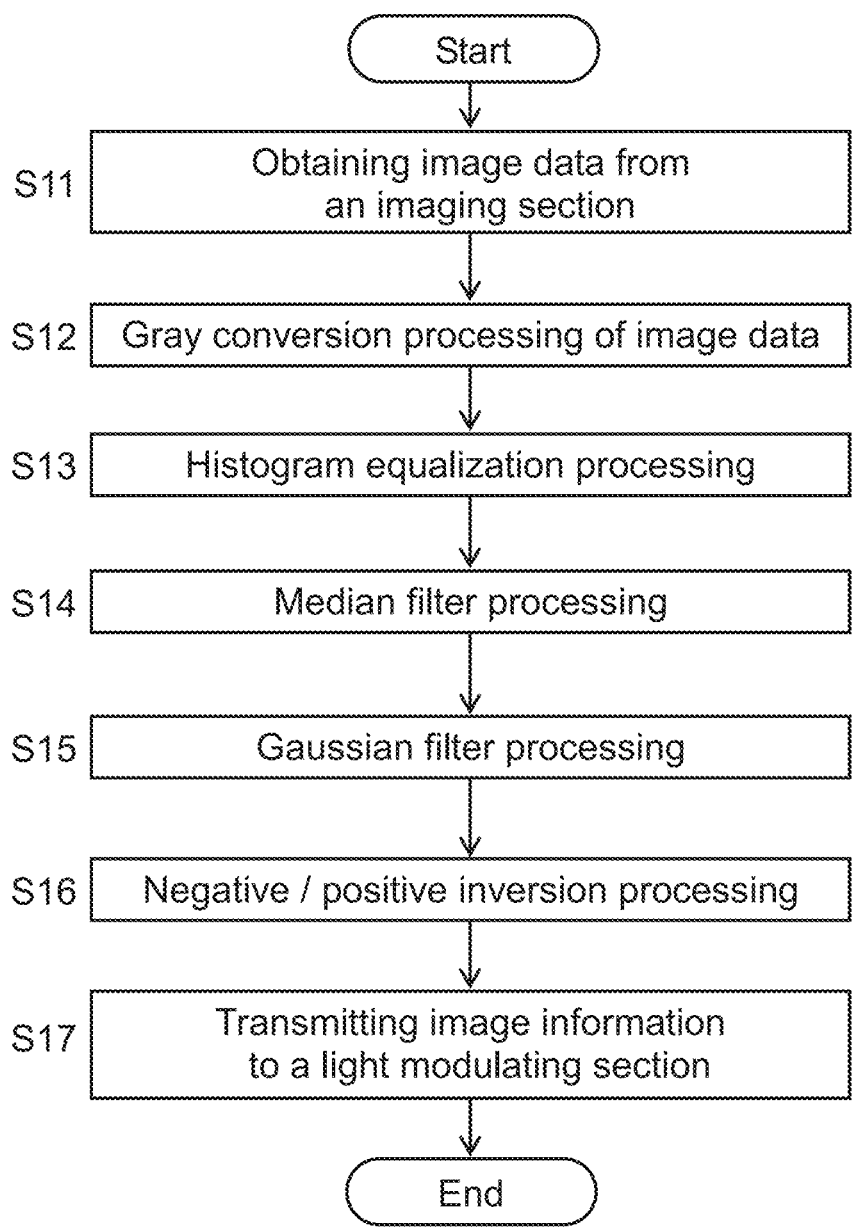
FIG. 5 is a flowchart illustrating processes done by an image processing method replacing the functions of the light intensity determining section and a light amount correcting section.

FIG. 5 is a flowchart of the image process applied to the light intensity determination and the light amount correction. The image process applied to the light intensity determination and the light amount correction are detailed hereinafter with reference to FIG. 5.

Light amount controller 13 obtains the image data supplied from imaging section 12 (step S11). The image data, in general, includes the information of three colors, viz. red, green, and blue; nevertheless, this embodiment refers to only the near infrared ray of mono color, so that light amount correcting section 13 carries out a gray conversion process to the image data supplied from imaging section 12 (step S12). The image data supplied from imaging section 12 is thus converted to a binary image. Next, light amount controller 13 obtains a brightness distribution (histogram) of the image, and then provides the histogram with an equalization process (step S13), thereby enhancing the contrast and converting the image into a clearer image. Next, light amount controller 13 carries out a median-filter process (step S14), thereby removes spike-shaped noises while leaving edge information of a shade section. Then light amount controller 13 uses a Gaussian filter for removing noises in the image (step S15). Light amount controller 13 applies an inversion process (negative/positive) to the image for producing an image in which light and shade are inversed (step S16). Finally, the information of the resultant image is transmitted to light modulator 106 (step S17). These processes allow the general-purpose computer to carry out a general image processing method that replaces the functions of light intensity determining section 104 and light amount correcting section 105.

The light intensity level of the object in the image data generated by imaging section 12 varies in response to the distance between the object and night vision imaging apparatus 1. On top of that, if the painting of a dress or a car contains a dye or a paint that absorbs near infrared rays, the reflection light from the illuminated object decreases drastically regardless of the distance between the object and night vision imaging apparatus 1. In this case, even if an output of the light supplied from light projecting section 11 is increased, it is difficult to obtain the image data at a proper exposure value. In such a case, light intensity determining section 104 can further include a shape determining function that can recognize a face or a license plate. To be more specific, light intensity determining section 104 recognizes the face or the license plate, thereby specifying a desirable part of the information, and selectively adjusting the light intensity of the part. This mechanism allows avoiding the effect of the paints or dyes that absorb infrared rays. To the contrary, if object light given off from the object, (e.g. a headlight of a car), contains extra intensive near-infrared rays, excluding of the headlight area will allow avoiding the effect of the headlight.

Figure 6:
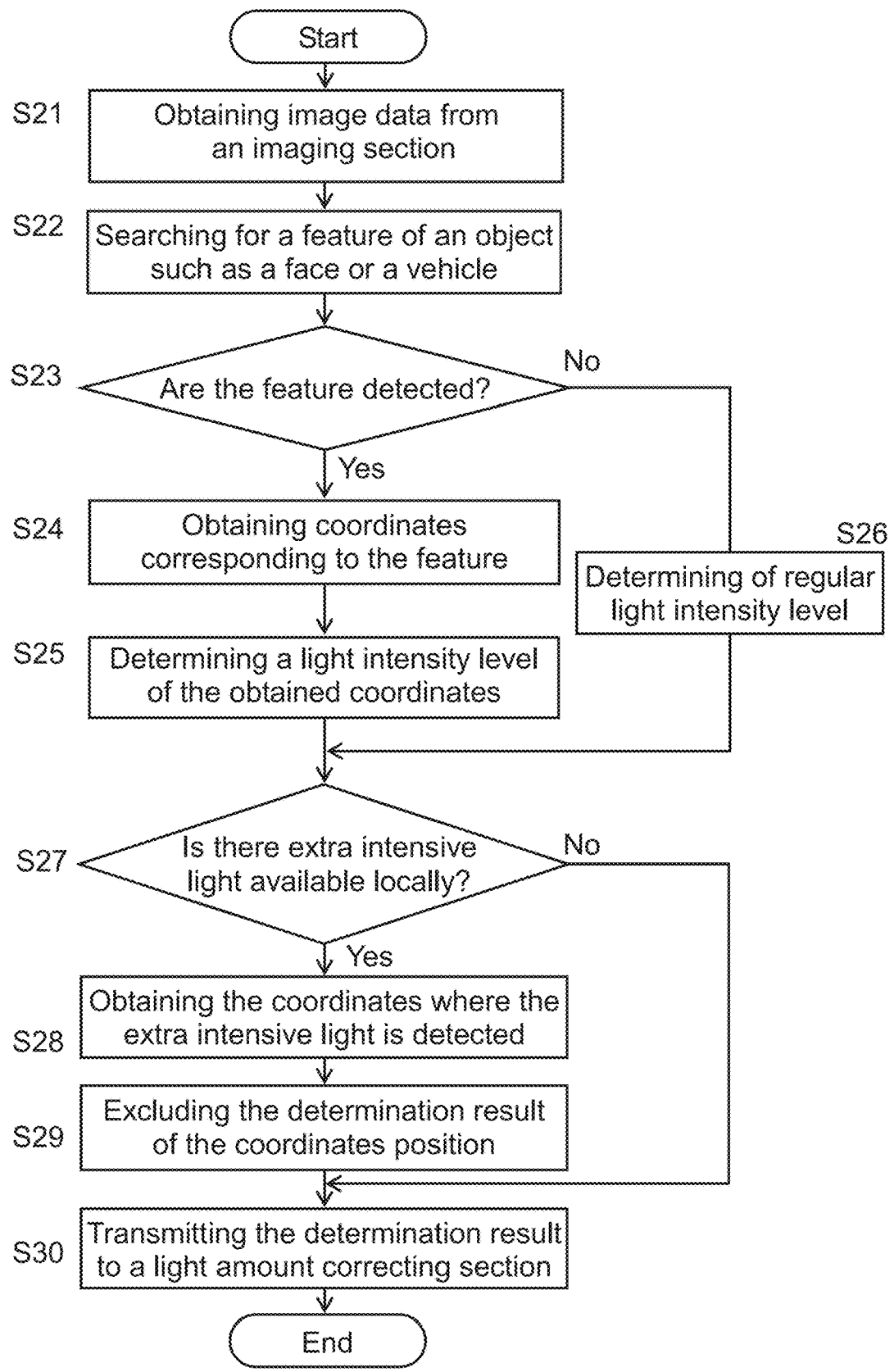
FIG. 6 is a flowchart illustrating operations of the light intensity determining section having a shape determining function.

FIG. 6 is a flowchart illustrating an example of operations of light intensity determining section 104 that includes the shape determining function. Operations of light intensity determining section 104 that includes the shape determining function are demonstrated hereinafter with reference to FIG. 6. Features for detecting a face or a car are pre-registered in light intensity determining section 104.

Light amount controller 13 obtains the image data supplied from imaging section 12 (step S21). Light intensity determining section 104 of light amount controller 13 searches through the image data for the pre-registered features of the face or the car with the aid of the shape determining function (step S22). Light intensity determining section 104 determines whether or not the pre-registered features are detected (step S23). If the features are not detected (branch NO of step S23), light intensity determining section 104 carries out a regular determination of light intensity level (step S26). In the case of the features being detected (branch YES of step S23), light intensity determining section 104 obtains a position of the object on the image, viz. the position is coordinates corresponding to the detected features (step S24). Next, light intensity determining section 104 determines a light intensity level at the obtained coordinate position (step S25).

Based on the result of light intensity level determination in step S25 or step S26, light intensity determining section 104 determines whether or not there is an extra intensive light (i.e. saturation value) in the determined light intensity levels (step S27). To be more specific, light intensity determining section 104 compares a light intensity level determined in some area with that in the adjacent area, and when a difference equal to or greater than a predetermined value is found, light intensity determining section 104 determines that the extra intensive light is available locally (branch YES of step S27). In this case, it is determined that extra intensive object light are available at the coordinate position. Light intensity determining section 104 then obtains the coordinates where the extra intensive object light is detected (step S28). Light intensity determining section 104 then deletes the light intensity determination result of the coordinate data obtained in step S28 from the result of light intensity level determined in step S25 or step S26 (step S29). This deletion allows avoiding the effect of the object light. Finally, light intensity determining section 104 transmits the determination result of the light intensity level to light amount correcting section 105 (step S30).

In the case of determining that there is no local intensive light (branch NO from step S27), light intensity determining section 104 transmits the result of light intensity level determined in step S25 or S26 to light amount correcting section 105 (step S30).

In this embodiment, imaging section 12 described in FIG. 1 employs a pickup element made of silicon-based semiconductor material, and LD 201 shown in FIG. 2 employs a semiconductor laser diode 201 (solid state light source element) having a wavelength of 850 nm at emission center. In the case of using this semiconductor laser diode 201 (i.e. the wavelength at its emission center is 850 nm), imaging section 12 can detect a red light emission on the surface of DMD 410 even if the illumination light contains near infrared rays, because a light density of the illumination light supplied from illumination device 200 is exclusively high on the surface of DMD 410. When night vision imaging apparatus 1 shoots a pedestrian on a street, and also the pedestrian desirably cannot sense the imaging, semiconductor laser diodes 201 of which emission wavelength is 940 nm can be used for instance. Use of such semiconductor laser diodes 201 will allow avoiding an appearance of the red light emission on the surface of DMD 410. On the other hand, some silicon-based semiconductor materials emitting the light, of which wavelength is 940 nm, tends to have quantum efficiency lower than that of another silicon-based semiconductor material of which wavelength is 850 nm. It is thus desirable that a pickup element of higher quantum efficiency in the near infrared ray region (e.g. gallium-based semiconductor) be selected.

1-4. Advantages

As discussed previously, night vision imaging apparatus 1 in accordance with this first embodiment comprises the following structural elements:

LD 201 (an example of light source element) emitting near infrared rays;

light projecting section 11 (an example of light projecting section) casting the near infrared rays supplied from LD 201 as illumination light on a predetermined illumination area;

light amount controller 13 (an example of light amount controller) controlling the amount of illumination light casted from light projecting section 11;

imaging section 12 (an example of imaging section) imaging an object illuminated with the illumination light supplied from light projecting section 11, and generating image data; and recording section 14 (an example of recording section) recording the image data generated by imaging section 12.

Light amount controller 13 divides an image shown in the image data into multiple divided portions R1, and determines a light intensity of each divided portion R1, then based on the determination results, controller 13 determines a light amount for each sub-area R2 of the illumination area, where the sub-area R2 corresponds to each divided portion R1.

The foregoing structure allows night vision imaging apparatus 1 to properly adjust an amount of the illumination light, which is to be casted on an object, for each area such that a difference in the brightness in the area of the imaged image can be reduced. This function allows imaging a quality image even in a situation (e.g. in the night) of low luminous intensity. To be more specific, the difference in brightness within a picture caused by the difference in distances between the object and night vision imaging apparatus 1 can be reduced. Night vision imaging apparatus 1 thus can relieve over-exposure or underexposure across the area of the image.

In this first embodiment, a cycle of the feedback of obtaining an image and a light projecting operation can be set equal to or lower than a cycle of obtaining the image data, where the cycle of obtaining the image data is determined based on a video film rate of imaging section 12. For instance, when the cycle of obtaining an image and a light projecting operation is 1/60 second, the feedback cycle of obtaining an image and the light projecting operation can be set equal to or shorter than 1/60 second (e.g. 1/120 second). This feedback setting allows night vision imaging apparatus 1 to effectively relieve the overexposure or underexposure across an imaging area without lowering the frame rate of imaging section 12.

In this first embodiment, light intensity determining section 104 does not necessarily include the shape determining function, and instead, it can recognize a shape of a face or a license plate, thereby specifying an area containing desirable information (e.g. person, vehicle). Then light intensity determining section 104 determines a light intensity level of the area containing the specified area that includes the desirable information, thereby controlling the light intensity level. This mechanism allows controlling the light intensity level of the area including the desirable information even if the painting of dress or car contains a paint or a dye that absorbs near infrared rays, so that information can be obtained more positively.

Object light given off from an object per se and contains extra intensive near-infrared rays (e.g. head light of a car) are discussed in this embodiment. In this case, the area containing the foregoing object can be excluded selectively from an objective area of correcting a light-amount, thereby avoiding the effect of the extra intensive near-infrared rays.

The first embodiment is an example of the techniques disclosed in the present patent application, nevertheless, the techniques of the present disclosure are not limited to the foregoing example, but are applicable to other embodiments where changes, replacements, additions, or omissions are done appropriately. The structural elements described in the embodiment can be combined for creating another embodiment.

Not to mention, the disclosed content is not limited to the specific example demonstrated in the foregoing embodiment, the modifications shown below are available for instance.

Second Exemplary Embodiment

In the first embodiment discussed above, light projecting section 11 and imaging section 12 are placed along lines orthogonal to the optical axes, and the center of the optical axis of light projecting section 11 deviates from that of imaging section 12. However, in this second embodiment, the center of optical axis of light projecting section 11 agrees with that of imaging section 12. In this second embodiment, structural elements similar to those used in the first embodiment have the same reference marks, and the descriptions thereof are omitted here.

Figure 7:
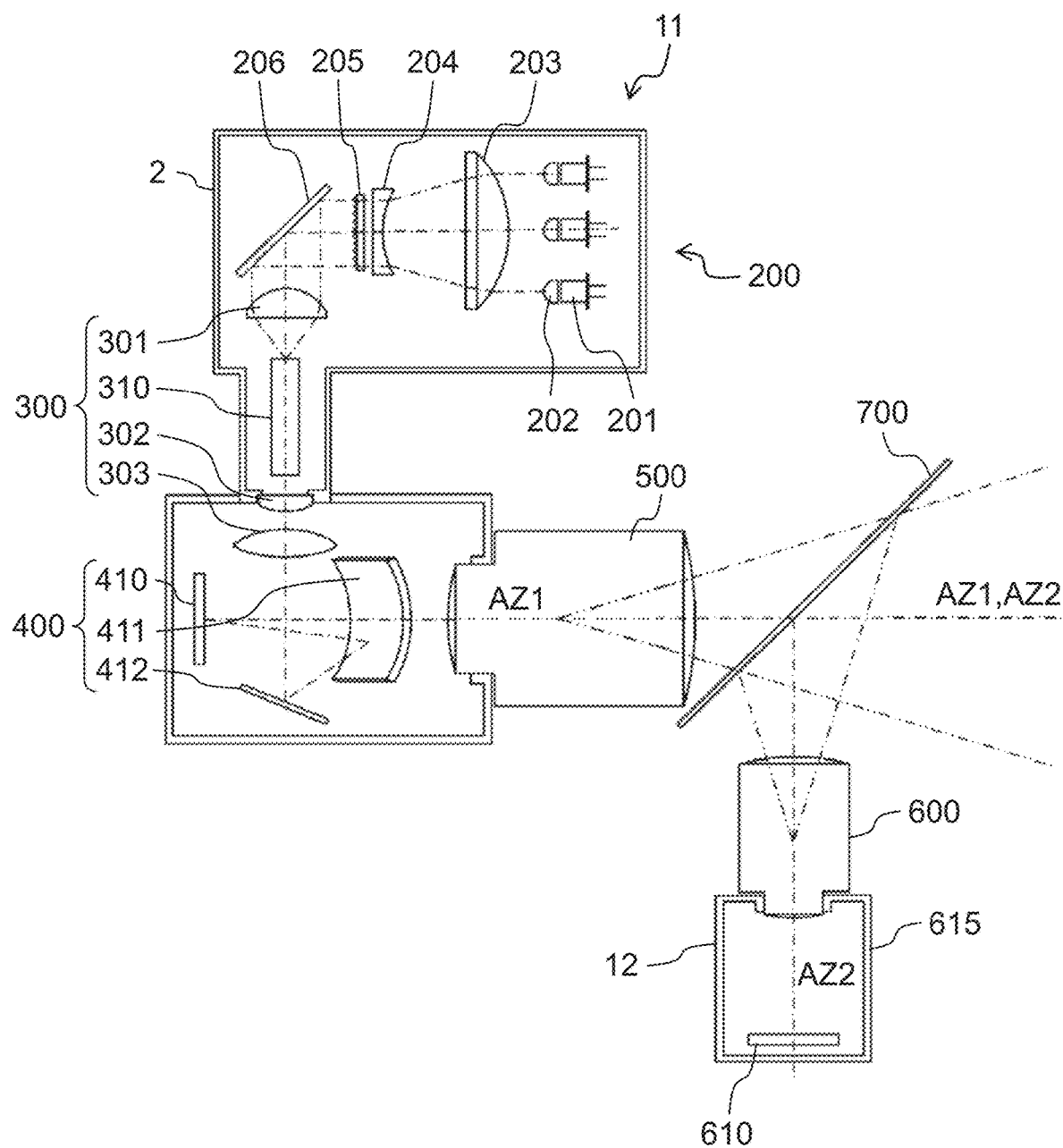
FIG. 7 schematically illustrates structures of a light projecting section and an imaging section in accordance with a second embodiment.

FIG. 7 schematically illustrates the placement of light projecting section 11 and imaging section 12 in accordance with the second embodiment. The optical axis of light projecting section 11 agrees with that of imaging section 12. These two sections are disposed such that optical axis AZ1 of projection optical system 500 is orthogonal to optical axis AZ2 of imaging optical system 600. Half mirror 700 is disposed such that it forms an angle of 45 degrees with respect to optical axis AZ1 and optical axis AZ2 respectively, and optical axis AZ2 is bent by half mirror 700 by 90 degrees, so that optical axis AZ1 agrees with optical axis AZ2.

Projection optical system 500, imaging optical system 600, and half mirror 700 are disposed such that a distance on optical axis from the projection pupil position of projection optical system 500 to half mirror 700 can be equal to a distance on optical axis from the incident pupil position of imaging optical system 600 to half mirror 700. They are also disposed such that an angle of view of projection optical system 500 can be equal to that of imaging optical system 600. The light supplied from light projecting section 11 penetrates through half mirror 700, and is casted on an object in an illumination area. Reflection light from the illuminated object and object light given off from the object per se are reflected from half mirror 700, and then enter imaging section 12.

The structure discussed above allows eliminating parallax generated between sub-areas R2 of the illumination area, on which light projecting section 11 casts the illumination light, and divided portions R1 of an entire area of image data obtained by imaging section 12. As a result, positional accuracy in detecting a light intensity level and in correcting an amount of illumination light can be improved.

Third Exemplary Embodiment

The first embodiment discussed previously refers to the structure in which the use of DMD 410 in light projecting section 11 allows the illumination device to project the illumination light of which light amount is corrected for each sub-area R2 of the illumination area. The illumination device can project the illumination light by a method of scanning a one-dimensional beam.

FIG. 8 schematically illustrates a structure of light projecting section 81 in accordance with the third embodiment, and this light projecting section 81 projects the illumination light by the method of scanning the one-dimensional beam. Light projecting section 81 includes LD 801, lens 802, reflection mirror 803, and MEMS (Micro Electro Mechanical Systems) mirror 804. MEMS mirror 804 is an example of the light modulation element. LD 801, lens 802, reflection mirror 803, and MEMS mirror 804 are hermetically placed in housing 8. Lens 802 is a collimator lens for paralleizing the light emitting from LD 801, and reflection mirror 803 changes a traveling direction of a light beam to enter MEMS mirror 804 at a given angle.

MEMS mirror 804 is a single plate of mirror having a bi-axial tilt mechanism, and is able to change an angle thereof with a control signal with respect to a vertical line of the picture (along pitch line) or a lateral line of the picture (along yaw line). The incident light to MEMS mirror 804 changes a beam angle along the yaw line or the pitch line, and is projected at a high speed in meander shape traveling through projection optical system 800. A change in an amount of light emitting from LD 801 in response to an angle timing controlled by MEMS mirror 804 will allow projecting the light having a different brightness for each sub-area R2 of the illumination area. This mechanism allows reducing the number of components and downsizing light projecting section 81. Not to mention, two units of MEMS mirrors 804 each having a uniaxial tilt mechanism can be used, and a control signal of each one of MEMS mirrors 804 changes the angle with respect to the vertical line (pitch line) of the picture or the lateral line of the picture (yaw line), thereby producing an advantage similar to what is discussed previously.

A light projecting speed of light projecting section 81 in accordance with the third embodiment is desirably set to a value equal to or greater than the frame rate of imaging section 12. For instance, assume that the image obtaining frame rate of imaging section 12 is set to an interval of 1/60 second (60 fps), a scanning by light projecting section 81 across the illumination face desirably ends at 1/60 second intervals. This setting allows imaging section 12 to obtain image data with less visible seams that are invited by the scanning. On top of that, if the scanning speed is set faster than 1/60 second interval in order to prevent flickers, the scanning speed is desirably set to an integral multiple of the image obtaining timing. This setting allows preventing cyclic flickers caused by the scanning.

Other Embodiments

The first through the third embodiments are described hereinbefore as examples of the techniques disclosed in this patent application, nevertheless, the techniques in the present disclosure are not limited to these examples, and are applicable to other embodiments in which changes, replacements, additions, or omissions are done appropriately. The structural elements described in the first through the third embodiments can be combined with each other for establishing a new embodiment. Other embodiments shown below are such examples.

The embodiments discussed previously refer to the example in which the light projecting section keeps projecting the illumination light during the operation of night vision imaging apparatus 1. However, the illumination light can be put out at predetermined intervals. Since the light amount correction discussed previously is useless for an area in which an object per se emits light, such as an electric lamp, the light amount correction can be thus omitted. In this case, it is necessary to detect such an area in which the object, like an electric lamp, per se emits light. Use of the image data imaged at the light off allows detecting the object emitting light by itself. The light projecting section thus can stop projecting the illumination light, for instance, every 60 frames. Based on the image data generated when the projection of the illumination light is halted, light intensity determining section 104 can then distinguish between the object emitting light by itself (i.e. object light given off from the object) and another object (i.e. illumination light reflected from the object). The timing of halting the illumination light can be set to a timing of a frame not to be recorded.

In the case where an area having a light intensity equal to or greater than a predetermined value is found in an image shown in the image data generated by imaging section 12, light intensity determining section 104 can exclude that area from the light intensity determination objectives, because a bright area, viz. the object, does not need the correction.

In the case where the area, in which the object (e.g. electric lamp) emits light by itself, is pre-recognized in the imaging area, an operator can pre-specify the position of that area in night vision imaging apparatus 1. Light amount correcting section 105 can be assigned not to correct an amount of illumination light casted on a specified sub-area in the illumination area. In other words, light amount correcting section 105 can always set the amount of illumination light casted on the specified sub-area in the illumination area to a fixed value. This setting allows saving a light amount correcting process in the area in which light amount correction is not needed, so that the correcting processes can be reduced.

As discussed above, the embodiments are demonstrated hereinbefore as examples of the techniques disclosed here. The accompanying drawings and detailed descriptions are provided for this purpose.

Among the structural elements described in the accompanying drawings and the detailed descriptions, there are structural elements essential to solutions of the present problems; however, there are structural elements not essential to solutions of the present problems but necessary for exemplifying the foregoing techniques. The description of those structural elements not essential to the solutions of the present problems in the accompanying drawings or the detailed descriptions shall not be straightly construed that the non-essential structural elements are essential ones.

Since the foregoing embodiments exemplify the techniques disclosed here, various changes, replacements, additions, and omissions can be done without departing from the scope or gist of the appended claims.

INDUSTRIAL APPLICABILITY

The night vision imaging apparatus disclosed here can properly adjust an amount of illumination light to be casted on an object for each area, so that this night vision imaging apparatus allows imaging a quality image in a situation of low luminous intensity, viz. in the night. The night vision imaging apparatus disclosed here is thus useful for the devices (e.g. surveillance camera) that shoots an image in the situation of low luminous intensity (e.g. in the night).

What is claimed is:
1. A night vision imaging apparatus comprising:
a light projecting section including a light source element emitting a near infrared ray, a digital micro device (DMD), and a projection optical system, and casting the near infrared ray as illumination light on an illumination area, the near infrared ray being casted through the projection optical system;
a light amount controller controlling an amount of the illumination light on each one of sub-areas forming the illumination area by the DMD, the DMD modulating light based on a modulation signal supplied from a light modulator;
an imaging section imaging the illumination area, and generating image data; and
a recording section recording the image data generated by the imaging section,
wherein the light amount controller divides an image shown in the image data into a plurality of divided portions, and determines a light intensity of each one of the plurality of divided portions, and then controls an amount of the illumination light to be casted on a sub-area corresponding to each one of the plurality of divided portions among the sub-areas of the illumination area based on the determined light intensity by the DMD, and wherein the light amount controller sets an amount of the illumination light to be casted on a predetermined sub-area of the sub-areas in the illumination area to a fixed value.

2. The night vision imaging apparatus according to claim 1, wherein the light source element includes semiconductor laser diodes configured to emit the near infrared ray.

3. The night vision imaging apparatus according to claim 1, wherein the light amount controller determines the light intensity based on brightness information of the image shown in the image data.

4. The night vision imaging apparatus according to claim 1, wherein the light amount controller further includes a function of recognizing a feature of an object in the illumination area from the image data, and controls an amount of the illumination light to be casted on each of the sub-areas in response to the determined light intensity and the recognized features of the object.

5. The night vision imaging apparatus according to claim 1, wherein the light projecting section stops casting the illumination light at a predetermined timing, and the light amount controller distinguishes the illumination light between reflection light reflected from the object and object light given off from the illumination area based on the image data generated when the casting of the illumination light is stopped.

6. The night vision imaging apparatus according to claim 1, wherein the light amount controller excludes a divided portion having a light intensity equal to or greater than a predetermined value among the plurality of divided portions from a result of the determined light intensity.

7. The night vision imaging apparatus according to claim 1, wherein the light amount controller changes a number of the plurality of divided portions in response to brightness information of the image shown in the image data.

8. The night vision imaging apparatus according to claim 1, wherein the light amount controller changes a number of the plurality of divided portions in response to a size of the illumination area.

9. A night vision imaging apparatus comprising:
a light projecting section including a light source element emitting a near infrared ray, and casting the near infrared ray as illumination light on an illumination area;
a light amount controller controlling an amount of the illumination light on each one of sub-areas forming the illumination area;
an imaging section imaging the illumination area, and generating image data; and
a recording section recording the image data generated by the imaging section,
wherein the light amount controller divides an image shown in the image data into a plurality of divided portions, and determines a light intensity of each one of the plurality of divided portions, and then controls an amount of the illumination light to be casted on a sub-area corresponding to each one of the plurality of divided portions among the sub-areas of the illumination area based on the determined light intensity, and
wherein the light amount controller sets an amount of the illumination light to be casted on a predetermined sub-area of the sub-areas in the illumination area to a fixed value.

* * * * *